Patented June 10, 1952

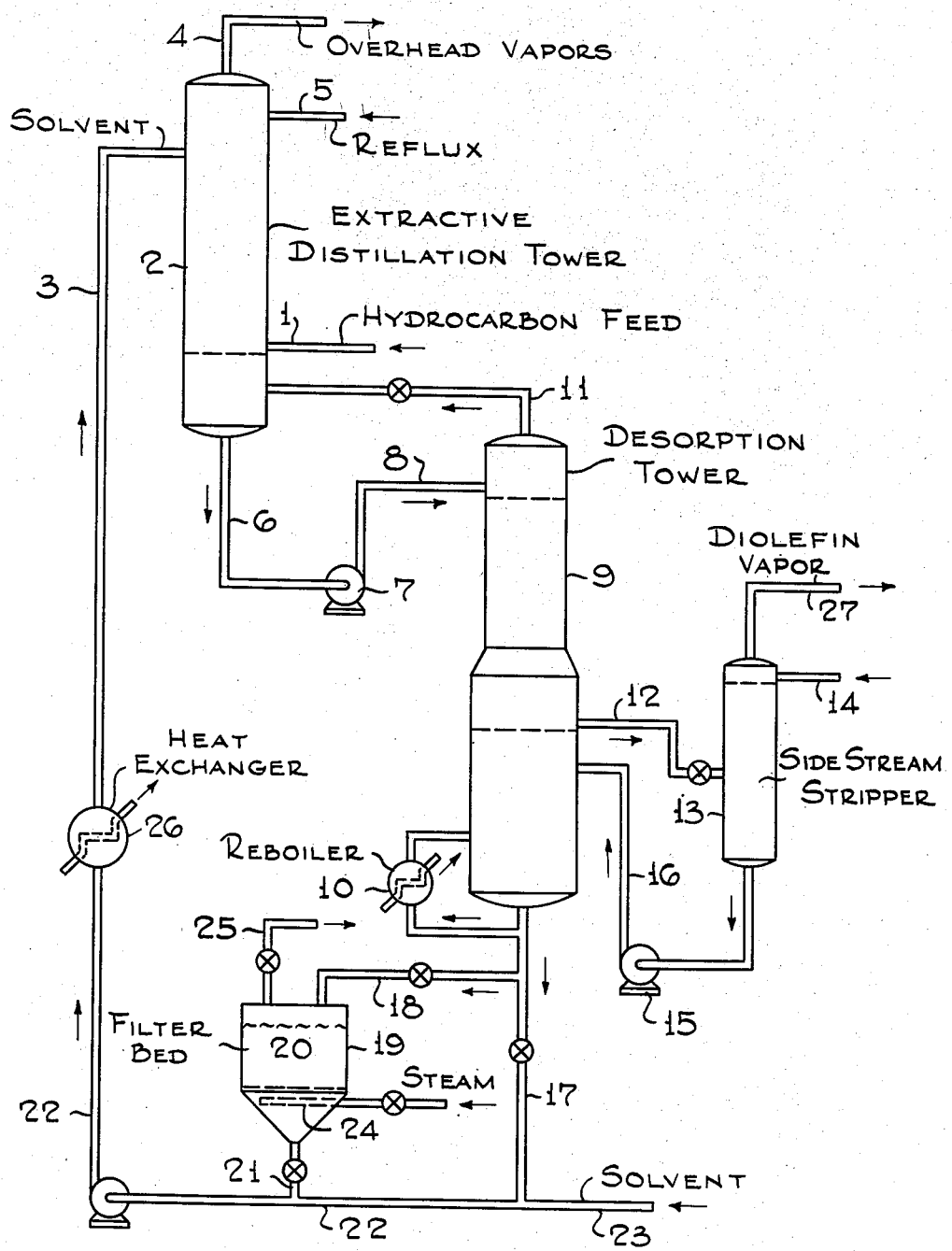

2,600,106

UNITED STATES PATENT OFFICE 2,600,106

REMOVAL OF DIOLEFIN POLYMERS FROM EXTRACTIVE DISTILLATION SOLVENT

Bowman S. Garrett, Bellerose, N. Y., assignor to Standard Oil Development Company, a corporation of Delaware Application June 10, 1948, Serial No. 32,173

5 Claims. (Cl. 202—39.5)

This invention relates to the separation of $C_5$ diolefins by extractive distillation with a polar organic solvent, such as acetone. It is particularly concerned with a treatment of the used solvent to recover by-products and maintain efficiency of the extractive distillation process.

In the extractive distillation process, the mono-olefin, as well as paraffin, components of a cracked hydrocarbon mixture are distilled overhead with a portion of the solvent while the diolefin components of the mixture are extracted by an undistilled portion of the solvent in the extractive distillation zone. An extracted diolefin is desorbed from the solvent-extract solution bottoms passed from the extractive distillation zone into a desorption zone, after which it is desirable to recycle the used solvent to an upper part of the extractive distillation zone for further separation of diolefins from mono-olefins.

When the extractive distillation process is employed to recover high purity isoprene as the separated diolefin desorbed from the solvent-extract solution, using acetone as the solvent, the solvent retains in solution high boiling materials such as polymers and some alcohol. These polymers include especially dimers and polymers formed from cyclopentadiene which is extracted in the extractive distillation zone with the isoprene. The segregation of the polymerized cyclopentadiene in this manner is advantageous provided the high boiling materials can be removed from the solvent and if the cyclopentadiene can be recovered. The presence of the high boiling materials and their increase in the solvent reduces its solvent power as is used a plurality of times to separate diolefins.

According to the present invention the described high boiling materials, i. e., the polymers and alcohols are removed from the used solvent by contacting the solvent containing them with a solid adsorbent, such as, activated carbon or clay.

The high boiling materials practically are all removed from the solvent if sufficient contact time with the adsorbent is given. This contact time varies from 0.25 volume of the solvent high boiling material solution per volume of adsorbent per hour to 5 volumes of the solution per volume of the adsorbent per hour. The quantity of high boiling material to be removed from the solvent may vary from 1% to 10% of the total solvent.

The high boiling materials can be removed from the adsorbent by stripping with steam. The cyclopentadiene polymers thus recovered can be cracked to cyclopentadiene, preferably after washing the high boiling materials with an aqueous solution for removing the alcohols.

A procedure for carrying out the invention will be described with reference to the accompanying drawing which illustrates an arrangement of apparatus suitable for accomplishing the objects thereof.

Referring to the drawing, a hydrocarbon feed stream, such as a narrow cut $C_5$ fraction containing isoprene, cyclopentadiene, and $C_5$ mono-olefins, is passed through pipe 1 into a lower part of extractive distillation tower 2 equipped with internal fractionating plates. Solvent, e. g. acetone with a small amount of water, is fed to an upper part of tower 2 through pipe 3.

The hydrocarbon feed is heated in tower 2 and vapors of the hydrocarbons pass up through the tower countercurrent to a descending stream of the solvent, with which the hydrocarbons are intimately contacted and fractionated. The thus fractionally distilled vapors, containing mono-olefins mixed with vapors of the solvent are taken overhead from tower 2 through pipe 4 for condensation and recovery. A reflux from the overhead distillate may be returned to the top of tower 2 through pipe 5.

Liquid bottoms removed by means of pipe 6 and pump 7 contain the extracted diolefins dissolved in a residual portion of the solvent. This bottoms fraction is passed by pipe 8 into an upper part of the desorption tower 9 internally equipped with fractionating plates and having a bottoms reboiler 10.

As the fat solvent, bottoms from tower 2, passes downwardly in tower 9, hydrocarbon vapors containing some of the absorbed mono-olefins are expelled and pass overhead through pipe 11 into a bottom part of tower 2 in which they impart heat for vaporing hydrocarbons in the initial feed from pipe 1. In a lower part of tower 9 the desorbed vapors are rich in the desired diolefin, e. g. isoprene, desorbed from the solvent and these vapors are withdrawn as a side-stream through pipe 12 into the side-stream stripper or concentrator 13, into an upper part of which is passed a liquid reflux stream of the diolefin by pipe 14. Undistilled bottoms from the side-stripper 13 are returned by pump 15 through pipe 16 into the desorption tower 9. The concentrated diolefin vapor is withdrawn through line 27.

A portion of the desorption tower solvent bottoms, in which the already described high boiling materials tend to accumulate, is withdrawn through bottom draw-off pipe 17 and diverted by pipe 18 into the filtration vessel 19. In vessel 19 the solvent passes through a bed 20 of the adsorbent material, which adsorbs the high boiling materials. The solvent thus freed of the high boiling materials is drawn off through pipe 21 into the return line 22 to be pumped back to the upper part of the extractive distillation tower 2. The thus treated bottoms lean solvent may be admixed with an untreated portion of bottom lean solvent withdrawn from desorption tower 9, also with fresh make-up solvent and solvent recovered from the overhead distillate of tower 2, passed into the return line 22 from inlet pipe 23.

The filtration vessel 19 may be equipped with steam jets in pipe 24 underneath the filter bed 20 for stripping adsorbed high boiling materials from the adsorbent during a period when solvent is not passing down through the bed. The high boiling materials vaporized by the high temperature steam are removed through pipe 25 for condensation and recovery.

A heat exchanger 26 in the return line 22 is used to regulate the temperature of the recycled solvent.

In a typical performance for separating isoprene, the extractive distillation tower 2 is operated at about atmospheric pressure (26 to 30 p. s. i. g.) with a temperature gradient therein of about 130° to 160° F. and the desorption tower is operated at a somewhat higher pressure (e. g. 31 to 35 p. s. i. g.) with a higher temperature gradient of about 160° F. to 206° F. Under these conditions it was found possible to maintain a good recovery of high quality isoprene (96% purity and higher) with negligible contamination of this product by cyclopentadiene, so long as the cyclopentadiene polymer was prevented from building up in the solvent.

In a typical treatment of the lean solvent withdrawn from the bottom of the desorption tower, the high boiling materials removed by contact with a clay adsorbent was analyzed as follows:

Total high boiling material, volume percent of total solvent_____ 3.4
Dicyclopentadiene, volume percent of total solvent _____ 1.4
Alcohols, tert. butyl etc., volume percent of total solvent_____ 0.8
Other hydrocarbon, volume percent of total solvent _____ 1.2

The method thus was demonstrated to be satisfactory for removing and recovering cyclopentadiene as its dimer, while incident thereto it was shown that the extractive distillation for separation of isoprene could accordingly be maintained at high efficiency.

The operating conditions are subject to variations depending upon the particular nature of the hydrocarbon feed, and solvent but the principles outlined are nevertheless applicable.

Although the method of removing polymers and securing high efficiency of an extractive distillation, as outlined, is especially applicable to the recovery of cyclopentadiene polymers in the separation of high quality isoprene, it may be applied advantageously to various $C_2$ to $C_6$ hydrocarbon mixtures containing components that form the undesirable high boiling materials which contaminate the organic solvent used in the extractive distillation separations of these hydrocarbons.

The useful organic solvents include various polar compounds such as glycols, amines, esters, nitriles, furfural, and the like. These solvents have preferential solvency for selectively separating hydrocarbons having different degree of saturation. These solvents may be used in the anhydrous condition or with various amounts of water to modify their selectivities. For example, a few percent of water enhances the selectivity of acetone in the separation of isoprene from pentenes, in the separation of butadienes from butenes, and in the separation of butylenes from butanes.

In the extractive distillation zone, the solvent, generally charged in a larger proportion than the hydrocarbon feed, increases the relative volatilities of the less saturated hydrocarbon components with respect to the more highly unsaturated components. Among the more highly unsaturated components are heat sensitive substances, such as cyclopentadiene, which react to form the high boiling materials.

By increasing the pressure and temperature in the desorption zone, the unstable components are made to further react so as to form the high boiling materials of lowered volatility, while the desorbed hydrocarbon component is then concentrated in the vapor phase and is more selectively separated.

What is claimed is:

1. In a process for the separation of hydrocarbons having different degrees of unsaturation in a mixture thereof including a readily polymerizable diolefin by extractive distillation of the hydrocarbons in the presence of a polar organic solvent selected from the group consisting of glycols, furfural, and acetone, the more saturated hydrocarbons of the mixture being distilled while the more unsaturated hydrocarbons of the mixture remain as an extract solution with an undistilled portion of the solvent, the improvement which comprises passing said extract solution into a desorption zone wherein said solution is heated to an elevated temperature under pressure so as to cause unstable extracted components of said solution including the readily polymerizable diolefin to react and form higher boiling materials that remain unvaporized while a more stable unsaturated hydrocarbon is desorbed from the extract solution, subsequently withdrawing remaining solvent containing said higher boiling materials from the desorption zone, and separating said higher boiling materials from the solvent by contacting the solvent-containing said higher boiling materials with an adsorbent selected from the group consisting of adsorbent clay and activated carbon.

2. In the separation of diolefins including cyclopentadiene from mono-olefins in a hydrocarbon mixture thereof by extractive distillation in the presence of polar organic solvent selected from the group consisting of glycols, furfural, and acetone, the mono-olefins being distilled overhead with a portion of the solvent while the diolefins are extracted by a residual portion of the solvent to form an extract solution therewith in an extractive distillation zone, the improvement which comprises passing the extract solution containing the extracted diolefins from the bottom part of the extractive distillation zone into a desorption zone, desorbing diolefin vapors from said extract solution in the desorption zone to obtain a lean solvent solution which remains contaminated by cyclopentadiene polymers as a bottoms liquid in said stripping zone, passing a portion of the bottoms liquid from said stripping zone into contact with a solid adsorbent selected from the group consisting of activated carbon and clay, freeing the thus contacted lean solvent solution of cyclopentadiene polymers and returning the lean solvent solution thus freed of cyclopentadiene polymers to an upper part of said extractive distillation zone.

3. In the separation of isoprene from a hydrocarbon mixture thereof with $C_5$ mono-olefins and containing cyclopentadiene by extractive distillation with an aqueous acetone solution, the mono-olefin being distilled overhead with a portion of said solution while the isoprene and cyclopentadiene are extracted by an undistilled portion of said solution in an extractive distillation zone, the improvement which comprises passing said undistilled solution containing the diolefins into a desorption zone, desorbing isoprene from the extract solution in the desorption zone leaving cyclopentadiene polymers in the solution, passing the thus obtained lean extract solution containing cyclopentadiene polymers into contact with adsorbent clay, and freeing the lean extract solution of the cyclopentadiene polymers adsorbed by said adsorbent clay.

4. In the separation of isoprene from a mixture thereof with $C_5$ mono-olefins and cyclopentadiene by extractive distillation with an aqueous acetone solution, the mono-olefins being distilled overhead with a portion of said solution while the isoprene and cyclopentadiene are extracted by a residual portion of said solution in an extractive distillation zone, after which the isoprene is stripped from the residual portion of solution in a desorption zone wherein cyclopentadiene dimer with other high boiling organic contaminants are left in the resulting lean residual solution, the improvement which comprises passing said lean residual solution from the desorption zone into contact with adsorbent clay, separating the resulting clay-treated aqueous acetone solution from the clay and from organic material adsorbed by the clay from said lean residual solution, and thereafter stripping said adsorbed organic material from the clay with steam to remove cyclopentadiene dimer from the clay and to regenerate the clay for reuse.

5. In an extractive distillation separation of mixtures of hydrocarbons including cyclopentadiene in the presence of a polar oxy-organic solvent selected from the group consisting of glycols, furfural, and acetone, the steps which comprises stripping extracted hydrocarbons from the solvent and under pressure at elevated temperatures at which cyclopentadiene becomes dimerized in the resulting lean solvent, and contacting the lean solvent containing the thus formed cyclopentadiene dimer with adsorbent clay, then removing the resulting lean solvent from the clay on which the cyclopentadiene dimer is adsorbed.

BOWMAN S. GARRETT.

REFERENCES CITED

The following references are of record in the file of this patent:

UNITED STATES PATENTS

| Number | Name | Date |
|---|---|---|
| 1,971,930 | Christiansen | Aug. 28, 1934 |
| 2,327,779 | Fisher | Aug. 24, 1943 |
| 2,350,609 | Hackmuth | June 6, 1944 |
| 2,377,049 | Souders | May 29, 1945 |
| 2,426,705 | Patterson | Sept. 2, 1947 |